(12) United States Patent
Hsu et al.

(10) Patent No.: US 6,924,788 B2
(45) Date of Patent: Aug. 2, 2005

(54) COLLAPSIBLE KEYBOARD

(75) Inventors: Chien-Shih Hsu, Taipei (TW); Chin-Cheng Li, Hsin-Chuang (TW); Mao-Sung Huang, Chang-Hua Hsien (TW)

(73) Assignee: Darfon Electronics Corp., Taoyuan (TW)

( * ) Notice: Subject to any disclaimer, the term of this patent is extended or adjusted under 35 U.S.C. 154(b) by 566 days.

(21) Appl. No.: 09/898,692

(22) Filed: Jul. 3, 2001

(65) Prior Publication Data

US 2002/0003530 A1 Jan. 10, 2002

(30) Foreign Application Priority Data

Jul. 5, 2000 (TW) ...................................... 89211576 U (51) Int. Cl.⁷ ............................................... G09G 5/00
(52) U.S. Cl. ..................................................... 345/168
(58) Field of Search ................................ 345/168, 169; 341/22–26; 400/472, 473, 492

(56) References Cited

U.S. PATENT DOCUMENTS 6,174,097 B1 * 1/2001 Daniel ........................ 400/472
6,266,234 B1 * 7/2001 Leman ........................ 361/680
6,331,850 B1 * 12/2001 Olodort et al. ............. 345/168
6,734,809 B1 * 5/2004 Olodort et al. ............... 341/22
2003/0002900 A1 * 1/2003 Lin ............................ 400/472

OTHER PUBLICATIONS

Official Gazette of Taiwan Patent No. 308331 (published Jun. 11, 1997), 2 pages, with English–language abstract.

* cited by examiner

Primary Examiner—Regina Liang
(74) Attorney, Agent, or Firm—Ladas & Parry LLP (57) ABSTRACT

A collapsible keyboard includes a keyboard base, at least one section hinge, a key base, at least one fixed hinge, at least one movable hinge and a plurality of keys. The keyboard base has a plurality of first sections. The section hinge connects the plurality of first sections so that the first sections are rotatable with respect to each other. The key base has a plurality of second sections provided on the first sections. The fixed hinge connects the second sections so that they are rotatable with respect to each other. The movable hinge connects one of the first sections and one of the second sections. The keys are provided on the second sections.

16 Claims, 14 Drawing Sheets

COLLAPSIBLE KEYBOARD

BACKGROUND OF THE INVENTION

1. Field of the Invention

The present invention relates in general to a collapsible keyboard that can be folded into a reduced size, facilitating transport.

2. Description of the Related Art

Generally, characters and symbols are input into a computer via a keyboard. Other input equipment such as mouse pointers or light pens fail to offer input speed and ease to match the keyboard. Therefore, the popularity of keyboards remains universal.

A conventional keyboard has a keyboard base, a key base and a plurality of keys. The key base is mounted on the keyboard base, while the keys are mounted on the key base. The user inputs data into the computer by typing the keys of the keyboard. Operation of the computer using the keyboard is easy and fast. Conventional keyboards are, however, too long to allow easy transport.

SUMMARY OF THE INVENTION

An object of the present invention is to provide a collapsible keyboard that can be folded into a reduced size, facilitating transport.

The keyboard of the present invention includes a keyboard base, at least one hinge, a key base, at least one fixed hinge, at least one movable hinge and a plurality of keys. The keyboard base has a plurality of first sections. The hinge connects the plurality of first sections so that the first sections are rotatable with respect to each other. The key base has a plurality of second sections provided on the first sections. The fixed hinge connects the second hinges so that the second sections are rotatable with respect to each other. The movable hinge connects one of the first sections and one of the second sections. The keys are provided on the second sections.

The keyboard in use has a longitudinal size equal to that of a conventional keyboard to comply with user habits. When the keyboard is not in use, the user can fold the keyboard so that the keyboard has a reduced size and easily carried.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
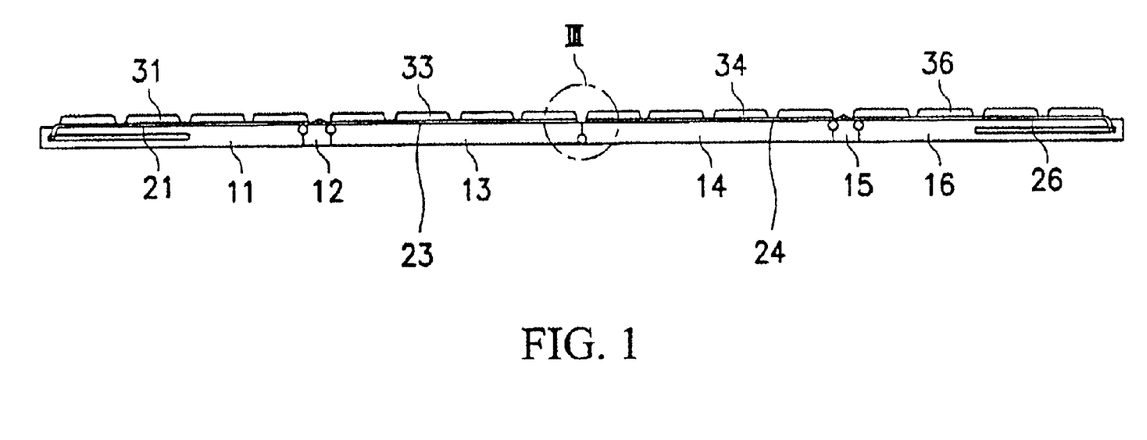
FIG. 1 is a front view of a collapsible keyboard in accordance with a first embodiment of the present invention.
Figure 2:
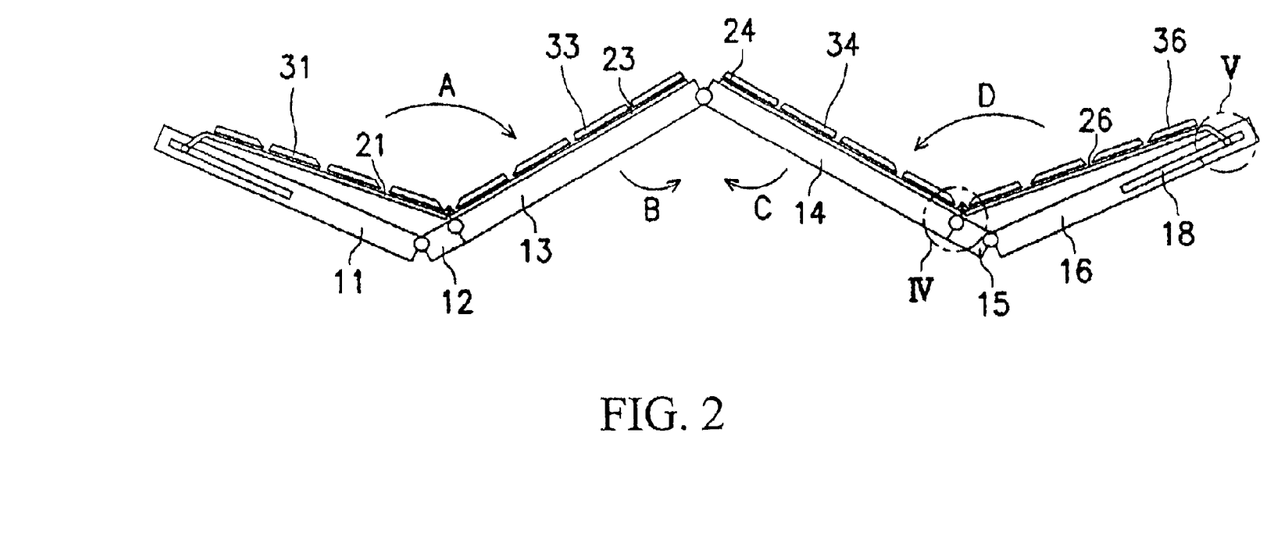
FIG. 2 depicts the collapsible keyboard of the first embodiment in a folding operation.

Referring to FIGS. 1 and 2, a collapsible keyboard of a first embodiment of the present invention includes a keyboard base, a key base mounted on the keyboard base and a plurality of keys mounted on the key base. The keyboard base has a plurality of sections 11, 12, 13, 14, 15, 16 connected by hinges, while the key base has a plurality of sections 21, 23, 24, 26 also connected by hinges. The keyboard can be folded via the hinges, and the detail is introduced later. The keys 31, 33, 34, 36 are mounted on the sections 21, 23, 24, 26 of the key base. The user types the keys to output corresponding signals to a computer (not shown).

Figure 3:
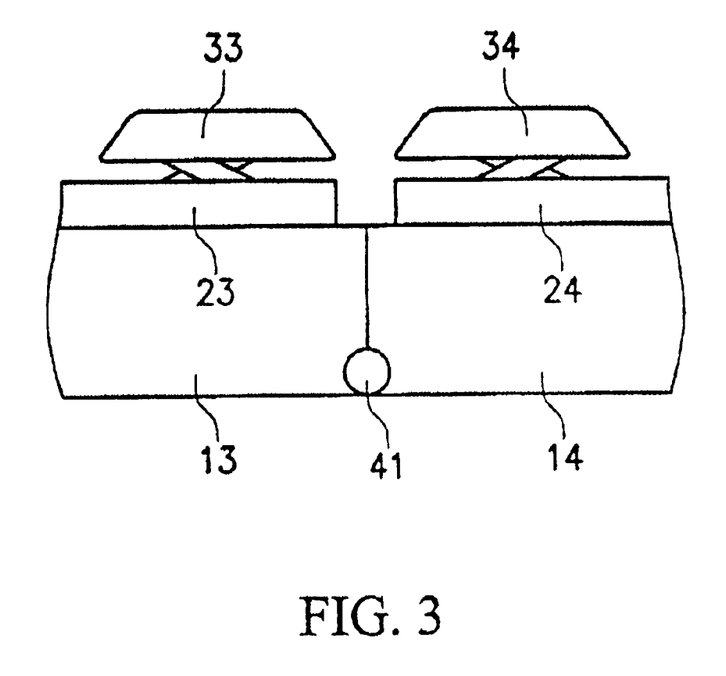
FIG. 3 is a local enlarged view of FIG. 1.

Now referring to FIG. 3, the sections 13, 14 of the keyboard base are connected by a hinge 41 so that the keyboard can be folded in the middle. Also, the sections 23, 24 of the key base are fixed to the sections 13, 14 of the keyboard base, respectively.

It is noted that the keyboard of the present invention has two halves, which are the same (symmetrical). For easy description, only the right half of the keyboard is introduced.

Figure 4:
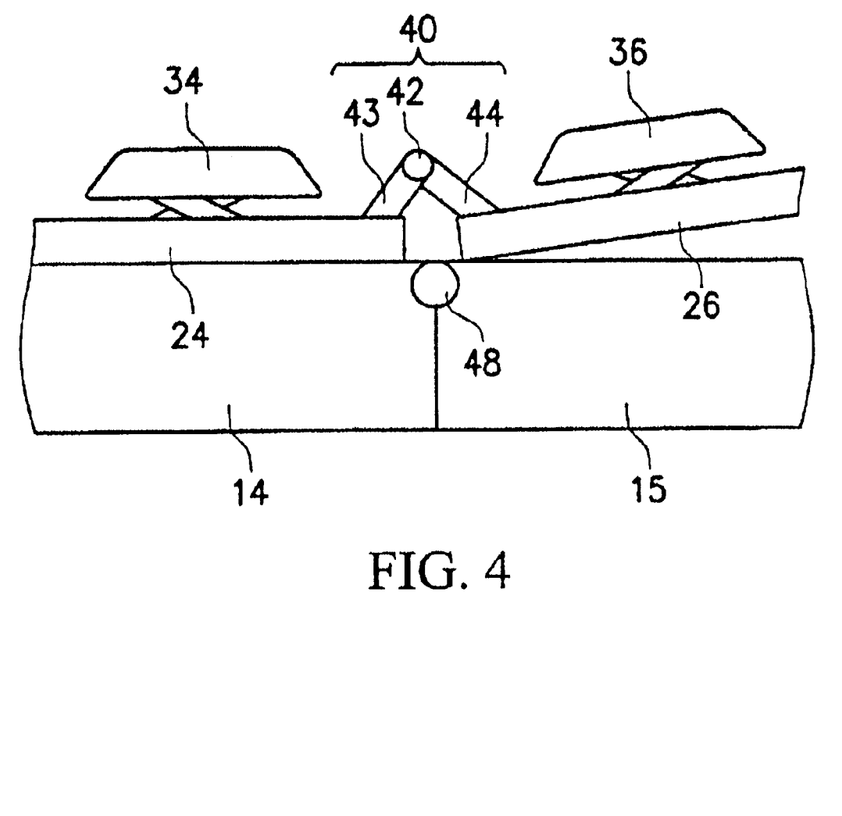
FIG. 4 is a local enlarged view of FIG. 2.
Figure 5:
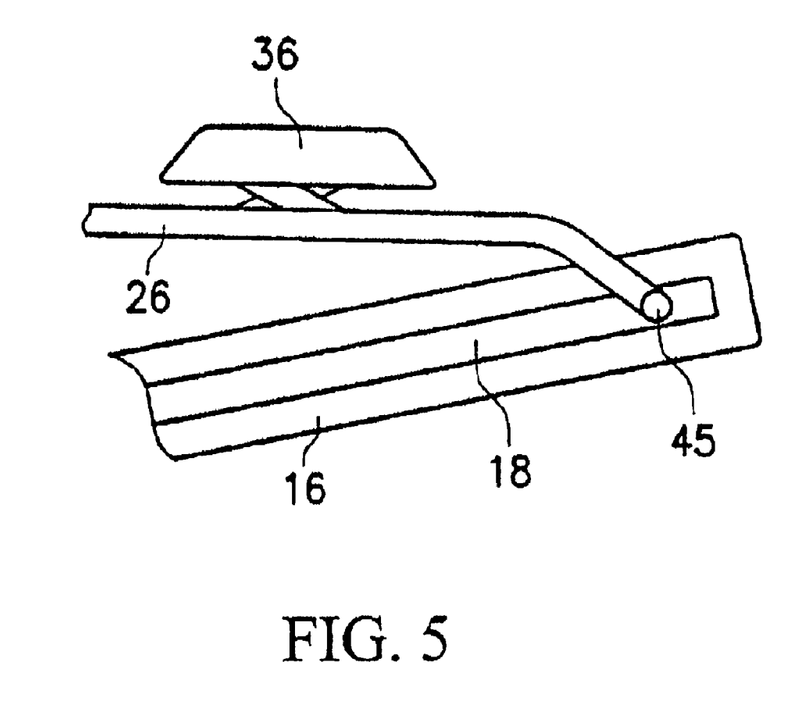
FIG. 5 is another local enlarged view of FIG. 2.

Referring back to FIG. 2, the section 26 has an end connected to a fixed hinge 40 (FIG. 4) and the other end connected to a movable hinge 45 (FIG. 5). Referring to FIG. 4, the sections 14, 15 of the keyboard base are connected via a hinge 48. The section 24 of the key base is fixed to the section 14 of the keyboard base, while the section 26 of the key base is put on the section 15 of the keyboard base. The sections 24, 26 of the key base are connected via the hinge 40. The hinge 40 includes two connecting rods 43, 44 and a pivot 42. The connecting rods 43, 44 raise the pivot 42 to avoid contact between the keys 34, 36 when the keyboard is folded. Referring to FIG. 5, the section 16 of the keyboard base has a groove 18 to receive the movable hinge 45. The movable hinge 45 connects the section 26 of the key base and the section 16 of the keyboard base. When the keyboard is folded, the hinge 45 moves in the groove 18.

Figure 6:
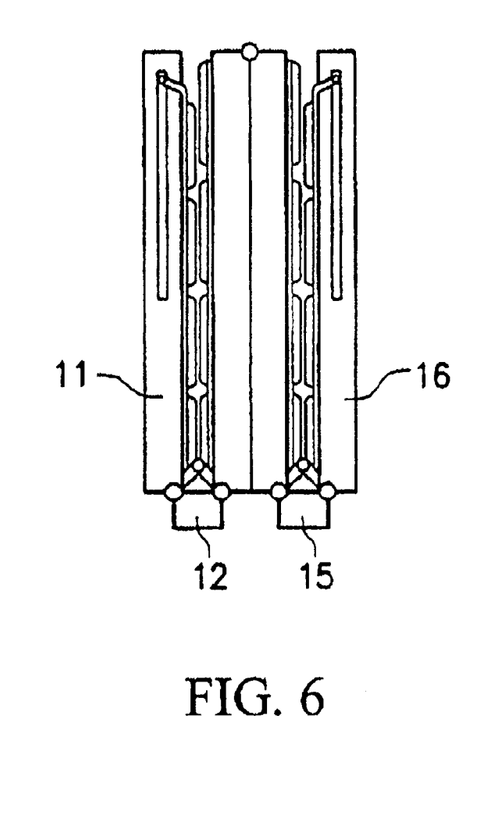
FIG. 6 depicts the collapsible keyboard of the first embodiment of the present invention, folded into a reduced size.

When the keyboard is in use, the keyboard is open and has a longitudinal size equal to that of a conventional keyboard to comply with user habits, as shown in FIG. 1. To fold the keyboard, the user simultaneously rotates the keyboard in directions A, B, C, D until the sections of the keyboard base contact with each other. As shown in FIG. 6, the longitudinal size of the keyboard is reduced by 75%. It is thus convenient for the user to carry the folded keyboard.

Figure 7:
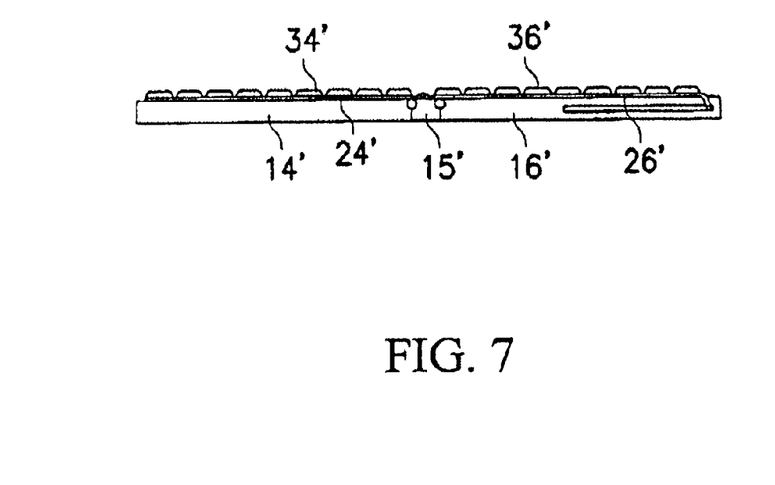
FIG. 7 is a front view of a collapsible keyboard in accordance with a second embodiment of the present invention.
Figure 8:
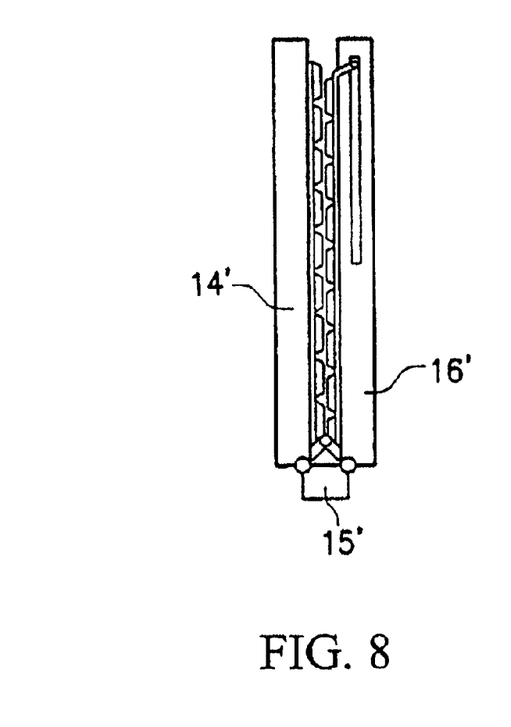
FIG. 8 depicts the collapsible keyboard of the second embodiment of the present invention, folded into a reduced size.

Referring to FIG. 7, a collapsible keyboard of a second embodiment of the present invention includes a keyboard base, a key base mounted on the keyboard base and a plurality of keys mounted on the key base. The keyboard base has a plurality of sections 14', 15', 16' connected by hinges, while the key base has a plurality of sections 24', 26' connected by other hinges so that the keyboard can be folded. The keys 34', 36' are mounted on the sections 24', 26' of the key base. The user types the keys to output corresponding signals to a computer (not shown). It is noted that the keyboard of the second embodiment is exactly the same as the right half of the keyboard of the first embodiment. Referring to FIG. 8, the longitudinal size of the keyboard is reduced by 50% when the keyboard is folded.

Figure 9:
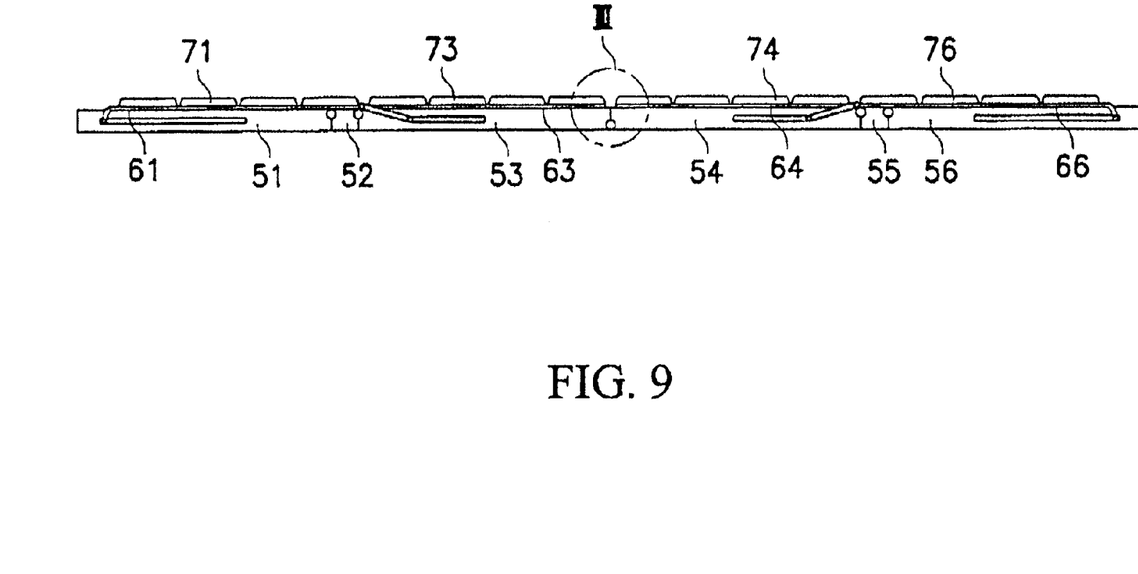
FIG. 9 is a front view of a collapsible keyboard in accordance with a third embodiment of the present invention.
Figure 10:
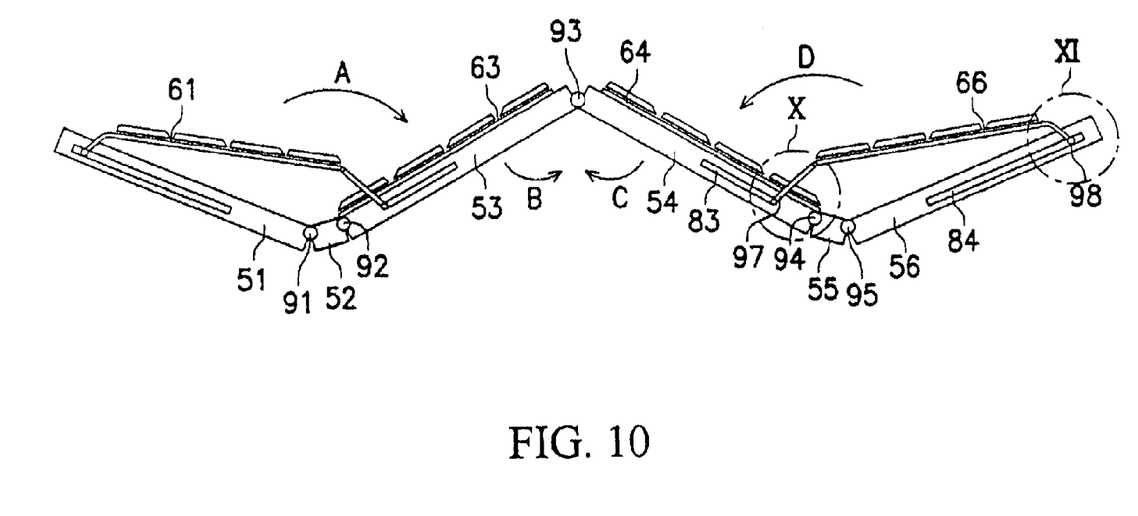
FIG. 10 depicts the collapsible keyboard of the third embodiment in a folding operation.
Figure 11:
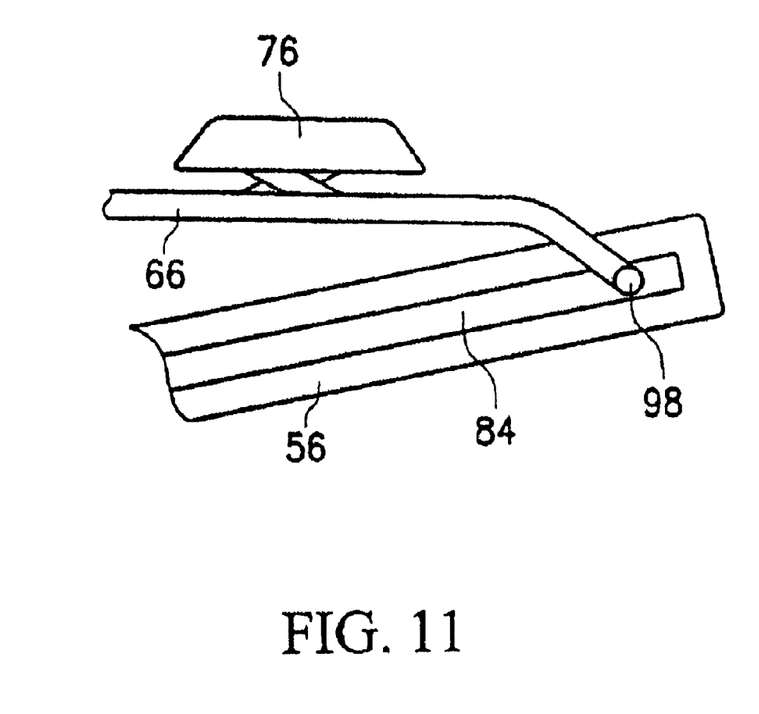
FIG. 11 is a local enlarged view of FIG. 10.
Figure 12:
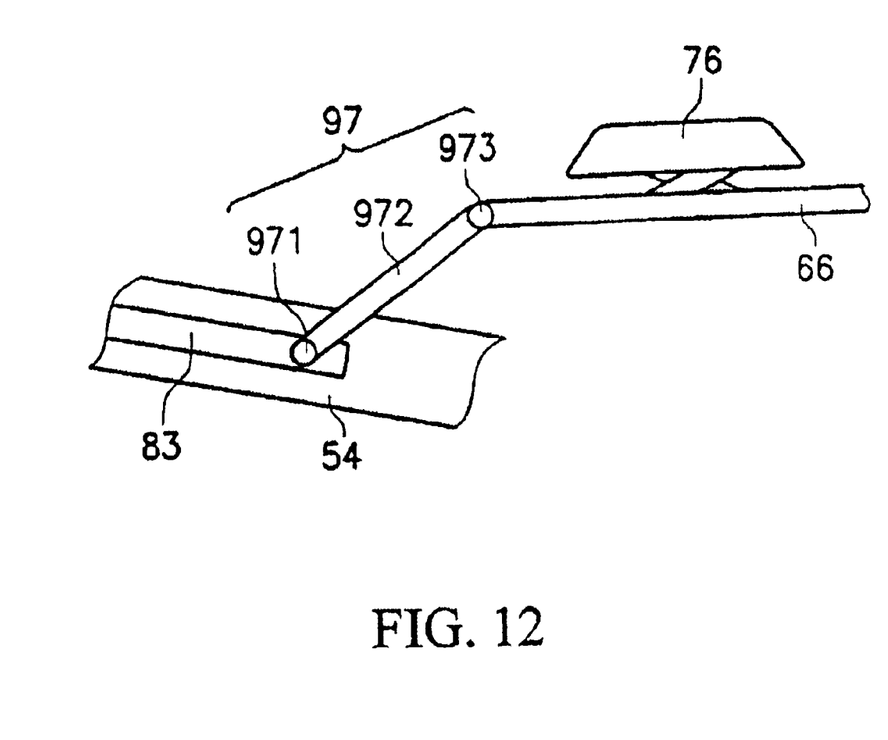
FIG. 12 is another local enlarged view of FIG. 10.

In the first and second embodiments, the section 26 or 26' of the key base has an end connected to a fixed hinge and the other end connected to a movable hinge. As well, both ends of the section 26 or 26' are connected to movable hinges. Referring to FIGS. 9 and 10, a collapsible keyboard of a third embodiment of the present invention includes a keyboard base, a key base mounted on the keyboard base and a plurality of keys mounted on the key base. The keyboard base has a plurality of sections 51, 52, 53, 54, 55, 56 connected by hinges 91, 92, 93, 94, 95. The key base has a plurality of sections 61, 63, 64, 66, with the keys 71, 73, 74, 76 mounted thereon. The middle sections 63, 64 of the key base are fixed on the sections 53, 54 of the keyboard base. The left section 61 of the key base is put on the sections 51, 52 of the keyboard base. The right section 66 of the key base is put on the sections 55, 56 of the keyboard base. The keyboard of the third embodiment is symmetrical. For easy description, only the right half of the keyboard is introduced. The sections 54, 56 of the keyboard base have grooves 83, 84 thereon, while both ends of the section 66 of the key base are connected to movable hinges 97, 98. Referring to FIG. 11, the movable hinge 98 is disposed in the groove 84 to connect the section 66 of the key base and the section 56 of the keyboard base. When the keyboard is folded, the hinge 98 moves in the groove 84. Referring to FIG. 12, the movable hinge 97 includes a connecting rod 972 and two pivots 971, 973. The pivot 971 is movably disposed in the groove 83, while the pivot 973 pivots the connecting rod 972 to the section 66 of the key base.

Figure 13:
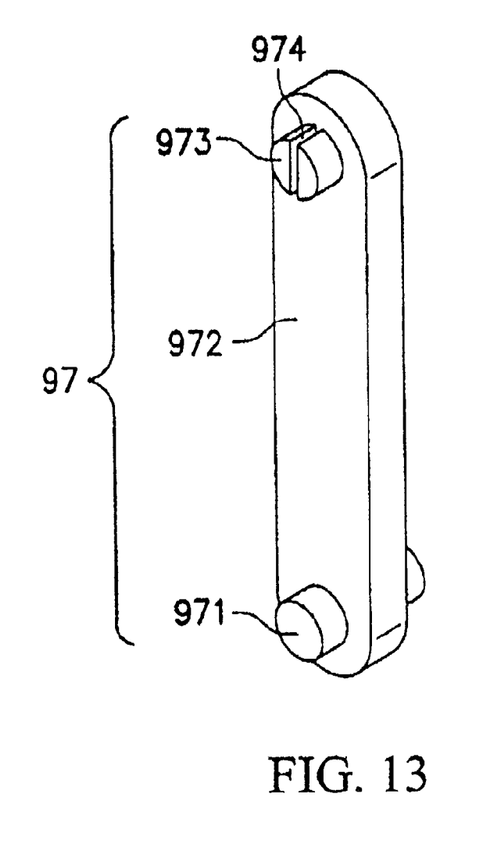
FIG. 13 depicts the connecting rod of FIG. 12.

Referring to FIG. 13, the pivot 973 has a gap 974 so that the pivot 973 can be compressed and fitted into the section 66 of the key base. Then, the connecting rod 972 is rotatable with respect to the section 66 of the key base and the section 54 of the keyboard base.

Figure 14:
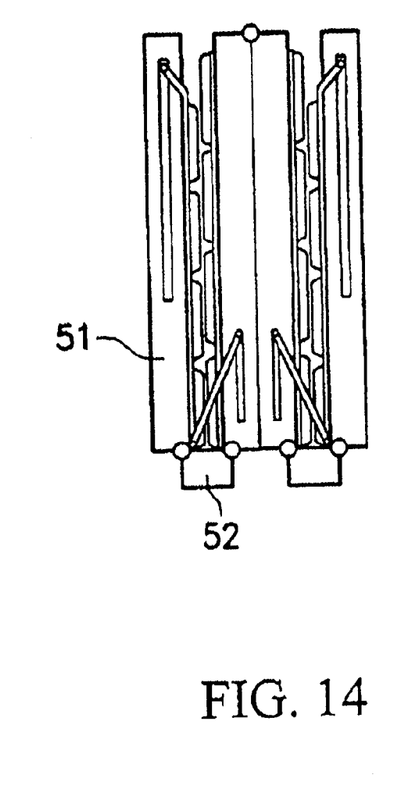
FIG. 14 depicts the collapsible keyboard of the third embodiment of the present invention, folded into a reduced size.

To fold the keyboard, the user simultaneously rotates the keyboard in directions A, B, C, D until the sections of the key base and keyboard base contact with each other. As shown in FIG. 14, the longitudinal size of the keyboard is reduced by 75%. It is convenient for the user to carry the folded keyboard.

It is understood that the pivots 971 and 973 can be replaced with each other. That is, the pivot 973 having the gap 974 is disposed in the groove 83, and the pivot 971 is connected to the section 66 of the key base. Such an arrangement also works.

Figure 15:
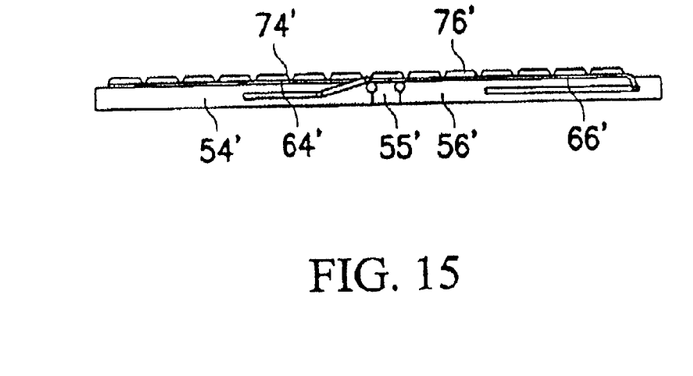
FIG. 15 is a front view of a collapsible keyboard in accordance with a fourth embodiment of the present invention.
Figure 16:
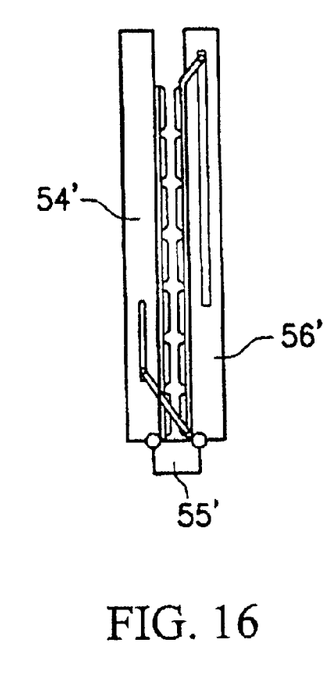
FIG. 16 depicts the collapsible keyboard of the fourth embodiment of the present invention, folded into a reduced size.

Referring to FIG. 15, a collapsible keyboard of a fourth embodiment of the present invention includes a keyboard base, a key base mounted on the keyboard base and a plurality of keys mounted on the key base. The keyboard base has a plurality of sections 54', 55', 56' connected by hinges, while the key base has a plurality of sections 64', 66' connected by other hinges so that the keyboard can be folded. The keys 74', 76' are mounted on the sections 64', 66' of the key base. The user types the keys to output corresponding signals to a computer (not shown) It is noted that the keyboard of the fourth embodiment is exactly the same as the right half of the keyboard of the third embodiment. Referring to FIG. 16, the longitudinal size of the keyboard is reduced by 50% when the keyboard is folded.

In conclusion, the present invention provides a collapsible keyboard. The keyboard in use has a longitudinal size equal to that of a conventional keyboard to comply with user habits. When the keyboard is not in use, the user can fold the keyboard so that the keyboard has a reduced size and is easily carried.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A collapsible keyboard, including:
    a first keyboard-base section;
    a second keyboard-base section rotatably connected to the first keyboard-base section so that the first and second keyboard-base sections are rotatable toward each other;
    a first key-base section provided on the first keyboard-base section;
    a second key-base section rotatably connected to the first key-base section so that the first and second key-base sections are rotatable toward each other, wherein the second key-base section is separably provided on the second keyboard-base section; and
    a plurality of keys mounted on the first and second key-base sections.

2. A collapsible keyboard as claimed in claim 1, further including a fixed hinge by which the first and second key-base sections are connected together.

3. A collapsible keyboard as claimed in claim 2, wherein the fixed hinge includes a pivot and two connecting rods, and the first and second key-base sections are connected to the pivot via the two connecting rods.

4. A collapsible keyboard as claimed in claim 1, further including a hinge by which the first and second key-base sections are connected together.

5. A collapsible keyboard as claimed in claim 4, wherein the hinge includes a first end connected to the first key-base section, a second end connected to the second key-base section, and a connecting portion connected between the first end and the second end.

6. A collapsible keyboard as claimed in claim 1, further including a movable hinge connecting the second key-base section and the second keyboard-base section, and the second keyboard-base section is moved by the second key-base section via the movable hinge when the first and second key-base sections are rotated toward each other.

7. A collapsible keyboard as claimed in claim 6, wherein the second keyboard-base section defines a groove to contain the movable hinge.

8. A collapsible keyboard, including:
    a first keyboard-base section;
    a second keyboard-base section rotatably connected to the first keyboard-base section so that the first and second keyboard-base sections are rotatable toward each other;
    a first key-base section provided on the first keyboard-base section;

a second key-base section separably provided on the second keyboard-base section and rotatably connected to the first keyboard-base section so that the first keyboard-base section and the second key-base section are rotatable toward each other; and a plurality of keys mounted on the first and second key-base sections.

9. A collapsible keyboard as claimed in claim 8, further including a movable hinge by which the first keyboard-base section and the second key-base section are connected together.

10. A collapsible keyboard as claimed in claim 9, wherein the movable hinge includes a first end movably and rotatably connected to the first keyboard-base section, a second end rotatably connected to the second key-base section, and a connecting portion connected between the first end and the second end.

11. A collapsible keyboard as claimed in claim 10, wherein the first keyboard-base section defines a groove to contain the first end of the movable hinge.

12. A collapsible keyboard as claimed in claim 10, wherein the first end of the movable hinge includes a pivot, and the pivot defines a gap so that the pivot can be compressed.

13. A collapsible keyboard as claimed in claim 10, wherein the second end of the movable hinge includes a pivot, and the pivot defines a gap so that the pivot can be compressed.

14. A collapsible keyboard as claimed in claim 8, further including a movable hinge by which the second keyboard-base section and the second key-base section are connected together, wherein the second keyboard-base section is moved by the second key-base section via the movable hinge when the second key-base section and the first keyboard-base section are rotated toward each other.

15. A collapsible keyboard as claimed in claim 14, wherein the second keyboard-base section defines a groove to contain the movable hinge.

16. A collapsible keyboard, including:

a first keyboard-base section;

a second keyboard-base section rotatably connected about a first axis to the first keyboard-base section so that the first and second keyboard-base sections are rotatable toward each other;

a first key-base section provided on the first keyboard-base section;

a second key-base section rotatably connected about a second axis to the first key-base section so that the first and second key-base sections are rotatable toward each other, wherein the second key-base section is separably provided on the second keyboard-base section and wherein the first axis and the second axis are spaced from each other; and a plurality of keys mounted on the first and second key-base sections.

* * * * *